United States Patent Office 3,000,863
Patented Sept. 19, 1961

3,000,863
DYE FIXING AGENT
Edgar E. Lineken, Somerville, N.J., assignor to American Cyanamid Company, New York, N.Y., a corporation of Maine
No Drawing. Filed May 4, 1956, Ser. No. 582,669
4 Claims. (Cl. 260—69)

This invention relates to an improved dye fixing agent and methods of improving the fastness properties of dyed materials by the use thereof.

In the past two decades, considerable work has been done to improve the characteristics of dyed materials, particularly cotton and other cellulosic fabrics dyed with direct dyes. In many cases the primary object has been to increase dye fastness, but in some cases other advantages, such as increased resistance to creasing and wrinkling, water repellency and the like, have also been achieved. One class of dye fixing agent which has achieved extensive commercial success is that of water-soluble, resinous condensation products of an aldehyde, such as formaldehyde, with amides. Among the earliest treatments were those of water-soluble urea formaldehyde resins. These were followed in turn by resins made from formaldehyde and melamine, guanidine, guanyl-urea, dicyandiamide, and similar products which contain the grouping

More recently acid-soluble condensation products of formaldehyde and cyanamide have been used. These treatments did in fact increase very markedly the wash fastness of the dyed material and in some cases its resistance to wrinkling and creasing. However, these desirable effects were obtained only at the serious loss of a very marked reduction in light fastness of the dyed material, for instance, in Patent 2,364,726 on page 1, left hand column, lines 42–44, this is emphasized.

Attempts were made to minimize this disadvantage by the addition of copper salts, and in fact, this constitutes the subject matter of the invention claimed in the above-referred-to patent which belongs to the older type of treatments which do not include formaldehyde-cyanamide condensation products. The addition of copper salts, for example copper acetate, to the solutions used in after treatment has in fact reduced to some extent the serious loss in light fastness. However, in spite of the optimistic predictions of the patentees of the patent referred to above, the addition of copper salts, particularly with cyanamideformaldehyde resins, has fallen far short of being a satisfactory solution of the serious problem of reduced light fastness which is to be noted when after treatments with aldehyde amide resins are used.

The present invention is directed to a new product and to methods of using it. I have found that if a cyanamide-formaldehyde condensation product is heated with copper compounds in weakly acid aqueous medium at temperatures around 80 to slightly over 100° C. and then the water evaporated off, a product is obtained which is water-soluble and which gives good wash fastness with negligible or no loss in light fastness and even in some cases actual increase in light fastness. Thus, the advantageous effects of the resin treatment are retained with negligible or no loss in other desirable properties.

The product obtained by the present invention has a chemical constitution which is at present not completely known. It is however known that the product is entirely different from the mixture of copper compounds and formaldehyde-cyanamide resins which have been used in the past. These compounds merely show under infrared the typical absorption bands for nitrile groups. The compound of the present invention is substantially free from any nitrile groups, infrared examination showing at most minute amounts contaminating the main product. Also there are absorption bands corresponding to acid and/or amide linkages. It is therefore possible that the nitrile groups may have been partially or wholly hydrolyzed. However, it is not intended to limit the present invention to any theory and it is quite possible that the actual chemical constitution is entirely different. All that is known, and this is known with certainty, is that the product of the present invention does not resemble chemically a mixture of cyanamide-formaldehyde resin and copper compounds. The infrared tests are substantiated by ultraviolet transmission of the compound dissolved in aqueous solutions. A very marked hypsochromic shift is present, showing that the compound of the present invention is an entirely different chemical compound. The marked difference in action on dyed materials is also clear evidence that the compounds are different because there is little or no loss in light fastness as opposed to very serious losses when the cyanamide-formaldehyde resin solutions are used with copper salts.

It is an advantage of the present invention that the method of preparing the compound is not critical. It is possible to start out with various cyanamide salts, such as calcium cyanamide, monosodium cyanamide, etc. Similarly, the acid to be used in the heating with the copper salt may be any of the ordinary strong organic acids of even dilute mineral acids. Optimum results are obtained with acids and copper acetate, which is either added as such or is generated in situ. This constitutes the preferred material. It is also an advantage that the formaldehyde may be obtained from various sources. Thus, ordinary aqueous formaldehyde solutions may be used, as can be polymers such as para-formaldehyde. Temperature and heating times are also not critical, but the heating should be maintained for a sufficient time until the transformation to the compound of the present invention is substantially complete, which can be checked by infrared, stopping when the nitrile groups no longer are present in any substantial amounts. It is an advantage of the present invention that heating to dryness results in a product free of nitrile groups.

The invention will be illustrated in greater detail in conjunction with the following specific examples in which the parts are by weight unless otherwise specified.

Example 1

Cyanamide-formaldehyde resin was prepared as follows: 75.3 parts of 85% monosodium cyanamide were dissolved in water at room temperature. The solution was then heated with stirring. When the temperature reached 50° C., the pH was reduced from about 11.9 to from 7.5–8.0 by the addition of about 112 parts concentrated hydrochloric acid. After the temperature reached 70° C., 90 parts of 37% aqueous formaldehyde solution were added with stirring. The pH was maintained at 7.5–8.0 by the occasional addition of a very small amount of alkali or acid as needed. When the cyanamide-formaldehyde resin began to precipitate, the temperature increased to 85–90° C. because of the exotherm of the reaction. Heating was stopped to permit the temperature of the reaction mixture to drop back to 70° C. and was maintained at this temperature and pH until the resin formation was complete. Thereupon the reaction mixture was cooled to room temperature, the precipitated resin filtered, washed and dried at 70° C.

Example 2

Twenty-five parts of the product of Example 1, 20 parts of cupric acetate monohydrate, 15 parts of glacial acetic acid and 10 parts of water were stirred together until the solids were thoroughly wet. Thereupon 1000 parts of boiling water were added and the mixture stirred until solution was complete. Thereupon the solution was evaporated to about 50% solids on a steam bath and dried in a vacuum oven at 80–110° C., at which point no substantial nitrile groups are shown by infrared.

Example 3

Forty-eight parts of technical calcium cyanamide are stirred into 240 parts of treated water at 45–50° C. The mixture was then filtered and 25 parts of 50% sulfuric acid added to the filtrate. Calcium sulfate precipitated, was filtered off and the filtrate warmed to 70° C. with stirring. Thereupon 32 parts of 36% aqueous formaldehyde solution were added and the mixture made just alkaline to Phenol Red paper by the addition of a small amount of 25% aqueous sodium hydroxide. A white precipitate began to form in a few moments and the mixture was stirred and then cooled to room temperature. The precipitate was then filtered off, washed with 250 parts of treated water and dried.

The procedure of Example 2 was repeated using a corresponding amount of the above-described material instead, in the place of cyanamide-formaldehyde resin obtained from monosodium cyanamide. The product obtained was identical with that of Example 2.

Example 4

The procedure of the preceding examples was repeated, substituting the aqueous formaldehyde by a corresponding amount of paraformaldehyde. The product obtained was the same.

Example 5

80 x 80 bleached cotton cloth was dyed with a series of direct dyes at a temperature of 200° F. in baths containing 30% sodium chloride. In each case the dyeing was continued until the dyebath was satisfactorily exhausted. Portions of two of the dyed cloths were then after-treated at room temperature with 2% cyanamide-formaldehyde resin and 1.5% of cupric acetate as described in Example 4 of United States Patent 2,253,457. The temperature was then raised to 140–160° F. until the after-treatment was complete. A portion of each of the dyed cloths was treated in the same manner with 3% of the product of Example 2 and another portion with 8%.

The materials dyed without after-treatment and those after-treated were tested for light fastness by test method 16A–54 described on page 99 of the Technical Manual and Yearbook of the AATCC of 1954. They were also subjected to wash fastness test No. 3 described on page 81 of the same manual. It should be noted that wash fastness units are accurate only to the nearest half unit. In other words, results differing by a half unit are the same within the experimental error of the test.

The material dyed with the copper complex of the azo dye obtained by coupling two mols of acetyl H acid to tetrazotized dianisidine gave an increase in wash fastness over the untreated control of 1.5 units in the case of the treatment of the patent and the same in the case of the 3% treatment of Example 2. However, the light fastness in terms of fadeometer hours was reduced by a factor of 8 in the case of the patent and a factor of 4 in the case of Example 2.

A second test was made with material dyed with the copper complex of the dye obtained by coupling 2 mols of R-salt with tetrazotized dianisidine. The increase in wash fastness was 2 units in the case of the patent, 1.5 in the case of the product of Example 2. Light fastness was reduced by a factor of 6 in the case of the treatment of the patent and by a factor of 2 in the case of the product of Example 2.

It will be noted that the treatment according to the present invention and that of the prior art produced substantially identical increase in wash fastness, but the loss in light fastness was very much less in the case of the present invention than in the case of the prior art treatment.

The following table shows the results of five additional dyeings. Dyeing No. 1 was with the dyestuff C. I. 502; No. 2, dyestuff C. I. 420; No. 3, dyestuff obtained by tetrazotized benzidine coupling on one end to salicylic acid and on the other to the dye which is the copper complex of the product formed by diazotizing 2-amino-4-sulfophenol and coupling to resorcinol; No. 4, C. I. 653; and No. 5, the bis copper complex of the dye formed by reacting 2 mols of 4-methoxy metanilic acid with 6,6'-ureylene-bis-1-naphthol-3-sulfonic acid.

*Fastness test*

| Dye Composition | Percent on Weight Of Cotton | Light Fastness (Fadeometer Hrs.) | | | Wash Fastness (Units) | | |
|---|---|---|---|---|---|---|---|
| | | Untreated Control | Product of Example 2 | | Untreated Control | Product of Example 2 | |
| | | | 3% | 8% | | 3% | 8% |
| C.I. 502 | 2 | 2.5 | 20 | | 1 | 1-2 | |
| C.I. 420 | 2 | 5 | 10 | | 1-2 | 4 | |
| Benzidine tetrazotized and coupled on one end to salicylic acid and on the other to the dye which is the copper complex of the product formed by diazotizing 2-amino-4-sulfophenol and coupling to resorcinol | 0.25 | 10 | | 15 | 2 | | 4-5 |
| C.I. 653 | 1.5 | 10 | | 5 | 1-2 | | 4.5 |
| The bis copper complex of the dye formed by the reacting of 2 mols of 4-methoxy metanilic acid with 6,6'-ureylene bis-1-naphthol-3-sulfonic acid. | .1 | 30 | 20 | | 1-2 | 3 | |
| | 0.25 | 20 | | 15 | 2 | | 3-4 |

It will be noted that in the case of some of the dyeings, there is an actual marked increase in light fastness when the treatment of the present invention is used instead of a lessened degree.

I claim:

1. A water-soluble copper adduct produced by suspending in an aqueous acid medium containing a dissolved cupric salt a known per se water-insoluble cyanamide-formadehyde condensation product formed at about pH 7.5–8; heating the resultant suspension to an elevated temperature in the range between about 80° and about 100° C.; maintaining the reaction mixture at said elevated temperature until the resultant reaction product is substantially free of CN groups detectable by infra red means; and then isolating the so-formed copper adduct.

2. A water-soluble copper adduct produced by suspending in an aqueous acetic acid medium containing a dissolved copper acetate a known per se water-insoluble cyanamide-formaldehyde condensation product formed at about pH 7.5–8; heating the resultant suspension to an elevated temperature in the range between about 80° and about 100° C.; maintaining the reaction mixture at said elevated temperature until the resultant reaction product is substantially free of CN groups detectable by infra red means; and then isolating the so-formed copper adduct.

3. The process which comprises; in an aqueous acid medium containing a dissolved copper salt, suspending a known per se water-insoluble cyanamide-formaldehyde condensation product formed at about pH 7.5–8; heating the resultant suspension to an elevated temperature in the range between about 80° and about 100° C.; maintaining the reaction mixture at said elevated temperature until the resultant reaction product is substantially free of CN groups detectable by infra red means; and then isolating the so-formed copper adduct.

4. The process which comprises; in an aqueous acetic acid medium containing a dissolved copper acetate, suspending a known per se water-insoluble cyanamide-formaldehyde condensation product formed at about pH 7.5–8; heating the resultant suspension to an elevated temperature in the range between about 80° and about 100° C.; maintaining the reaction mixture at said elevated temperature until the resultant reaction product is substantially free of CN groups detectable by infra red means; and then isolating the so-formed copper adduct.

References Cited in the file of this patent

UNITED STATES PATENTS

| | | |
|---|---|---|
| 2,253,457 | Whittaker | Aug. 19, 1941 |
| 2,364,726 | Landolt | Dec. 12, 1944 |
| 2,526,106 | Albrecht | Oct. 17, 1950 |
| 2,576,241 | Spangler | Nov. 27, 1951 |

OTHER REFERENCES

Fuson and Snyder: "Organic Chemistry," John Wiley and Son, New York (1942), p. 367.